United States Patent [19]

Theobald

[11] Patent Number: 5,184,862
[45] Date of Patent: Feb. 9, 1993

[54] CARRIER DEVICE

[75] Inventor: Thomas Theobald, Heilbronn-Bockingen, Fed. Rep. of Germany

[73] Assignee: ITW-Ateco GmbH, Norderstedt, Fed. Rep. of Germany

[21] Appl. No.: 525,822

[22] Filed: May 21, 1990

[30] Foreign Application Priority Data

May 19, 1989 [DE] Fed. Rep. of Germany ....... 8906204

[51] Int. Cl.⁵ .............................................. B65G 7/12
[52] U.S. Cl. .................................. 294/145; 16/114 R; 294/137; 294/165
[58] Field of Search ............... 294/149, 153, 156, 170, 294/903, 137, 1.1, 15, 27.1, 31.2, 74, 92, 67.1, 67.3, 68.27, 81.5, 82.1, 82.11, 145, 147, 151, 158, 164, 165, 167–169; 16/114 R, 110 R, 110.5, 112, 126, DIG. 24; 411/387, 401, 378, 475, 400; 220/94 R

[56] References Cited

U.S. PATENT DOCUMENTS

| 272,067 | 2/1883 | Lindsay | 294/149 X |
|---|---|---|---|
| 735,618 | 8/1903 | Tannewitz | 411/424 X |
| 1,260,709 | 3/1918 | Reilly | 16/110 R |
| 1,600,970 | 9/1926 | Bosca | 16/110.5 |
| 2,224,561 | 12/1940 | Wiora | 294/92 |
| 2,413,280 | 12/1946 | Ashenden | 294/82.11 X |
| 2,425,564 | 8/1947 | Ring | 294/170 X |
| 2,503,794 | 4/1950 | Brown | 294/104 |
| 2,848,267 | 8/1958 | Wroblewski | 294/1.1 |
| 3,313,509 | 4/1967 | Lockert | 411/401 X |
| 3,314,711 | 4/1967 | Dietz et al. | 294/81.5 X |
| 3,865,419 | 2/1975 | Bowers et al. | 294/903 X |
| 3,935,787 | 2/1976 | Fisher | 16/110 R |
| 4,029,248 | 6/1977 | Lee | 294/903 X |
| 4,245,860 | 1/1981 | Hinds | 294/74 |
| 4,477,217 | 10/1984 | Bona Corsi | 411/387 |
| 4,645,396 | 2/1987 | McCauley et al. | 411/387 |
| 4,699,415 | 10/1987 | Skovajsa | 294/147 |
| 4,746,042 | 5/1988 | King | 224/148 |
| 4,942,995 | 7/1990 | Myers | 294/170 X |

FOREIGN PATENT DOCUMENTS

| 1678297 | 12/1971 | Fed. Rep. of Germany | 294/165 |
|---|---|---|---|
| 656036 | 8/1951 | United Kingdom | 294/145 |
| 2181404 | 4/1987 | United Kingdom | 294/27.1 |

Primary Examiner—Johnny D. Cherry
Attorney, Agent, or Firm—Schwartz & Weinrieb

[57] ABSTRACT

A detachable carrier device for bulky articles includes a coupling portion and a handling portion. The coupling portion has an elongated aperture adapted to be engaged by the head of a screw threaded into the article. The aperture includes a large diameter portion for initially cooperating with the screw head under no load conditions, and a smaller diameter portion for cooperating with the screw head under load conditions whereby the article can be safely supported and transported by the carrier device.

13 Claims, 2 Drawing Sheets

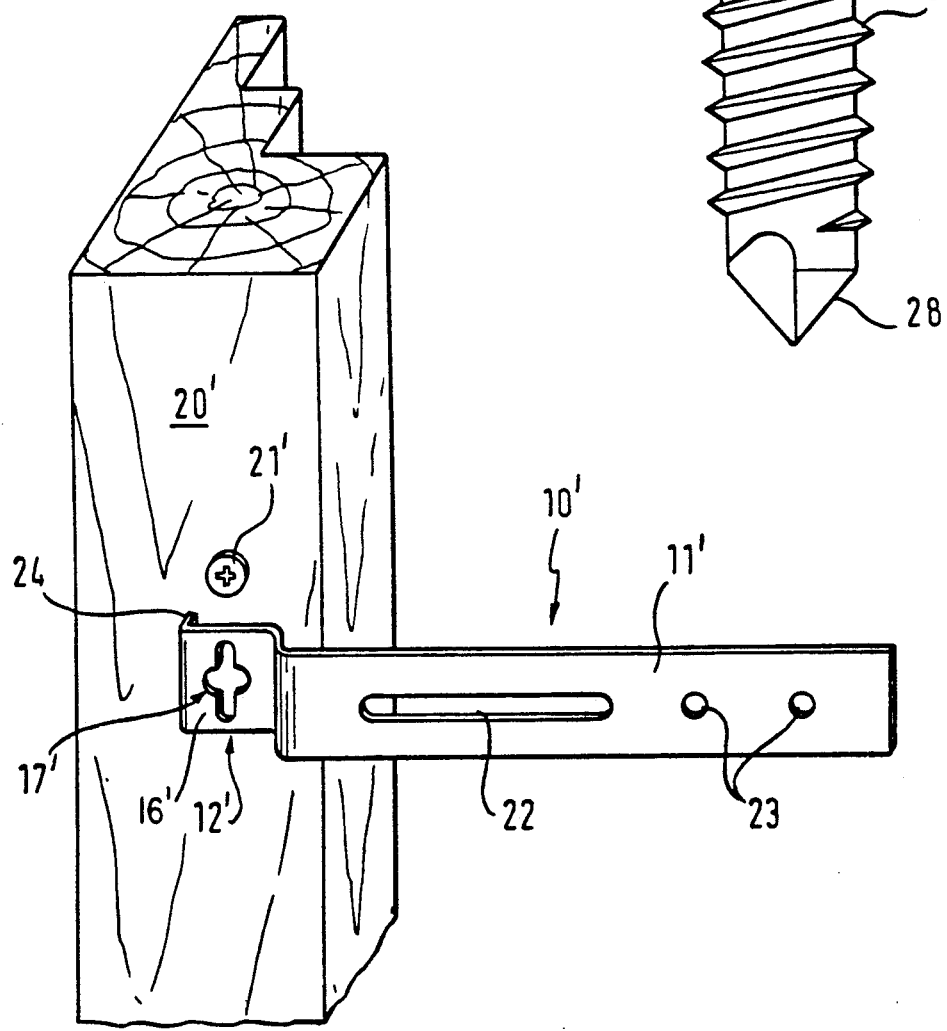

CARRIER DEVICE

FIELD OF THE INVENTION

The present invention relates to carrier devices, and more particularly to a detachable carrier device for supporting a load or article during, for example, transportation of the same.

BACKGROUND OF THE INVENTION

For various reasons, the transportation of bulky articles causes problems. One problem is seen to be that the surfaces of such articles usually offer no or insufficient means for holding or supporting the article. As a result of such circumstances, the lifting and control of the article during the transportation of the same is rendered quite difficult and cumbersome.

A particular problem for example is the transport of frames, such as, for example, for doors or windows during their manufacture and also in connection with their assembly. In view of the materials used for fabricating such articles, and the sizes, such frames can have a considerable weight. During the transportation of the same, normally the center of gravity extends largely beyond the location where the frame is retained, that is, at least one of the persons holding the frame has to support it within the upper region thereof so as to prevent the same from overturning. Thus, this person has only one hand free to support the frame. This normally is not sufficient to guarantee safe transportation of the frame, in particular if the frame includes a smooth surface.

SUMMARY OF THE INVENTION

The invention provides a detachable carrier device for bulky articles and is adapted to be coupled to the articles during their transportation and to be reused after such transportation has been completed.

The carrier device according to the invention comprises a gripping or handling portion and a coupling portion connected to the gripping portion. An elongated opening is provided within the coupling portion which serves for gripping the head of a screw threaded into the article to be supported and transported.

The function of the carrier device according to the invention is very simple. It is required to thread a screw into the article to be transported such that the head of the surface of the screw protrudes from the article. The coupling portion is brought into engagement with the screw head with its opening initially disposed behind the head. The opening is shaped such that during the transportation, the coupling portion does not inadvertently disengage from the screw head. The carrier can be conveniently held and transported through means of the gripping or handling portion connected to the coupling portion. After the transportation of the article has been accomplished, the coupling portion can be separated from the screw head. The screw should be designed such that it guarantees a sufficient support of the article to be transported. If for example plastic frames having no metal core are to be transported, the screws should include a thread suitable for plastic materials, such as, for example, high-pitch threads.

According to an embodiment of the invention, the opening or the aperture defined with-in the coupling portion can be designed in various ways. Principally, two different versions can be selected. In accordance with one version, the coupling portion completely encompasses the opening while in accordance with the other version, the opening extends toward a lateral edge of the coupling portion. One embodiment encompassed by means of the first version is for example defined by means of an opening having a diameter which is continuously decreasing in the longitudinal direction. The smallest diameter portion is defined within an area of the opening disposed remotely from the gripping portion. This type of configured opening is initially placed upon the screw by means of its larger area. Upon impression of a load upon the coupling portion by means of the weight of the article to be transported, the screw automatically slides into the area of the coupling portion having the smaller diameter, thus locking the coupling portion with respect to the article being supported and transported.

As mentioned above, the opening can also be formed so as to extend from one lateral edge of the coupling portion. Such a coupling portion can be positioned beneath the screw head in order to lock the coupling portion with respect thereto. In this case, the diameter of the opening can be constant throughout its length. However, it is to be appreciated that the opening has an edge which is suited for bearing a load. This means that the area adjacent to the closed end of the opening must extend towards the gripping portion.

The coupling portion can be made of metal or plastic material. It can be formed as a rigid or flexible connector. In case the coupling portion is made of plastic sheet material, means can be provided so as to prevent the opening from breaking or tearing. For example, an annular ring can reinforce the opening.

The gripping portion can be a simple conventional loop of plastic material, metal or natural fiber material. The diameter of the loop is preferably designed such that it can be simply manually gripped. Furthermore, the loop material should have a sufficient width so as to prevent the loop from cutting into the hand of the person transporting the article during the transportation of heavy articles.

Instead of a loop, the gripping portion may be an elongated T-shaped element of metal, plastic material or the like. The transverse portion of the T-element is oppositely located with respect to the coupling portion and can be rigidly formed. The longitudinal portion connecting the transverse portion to the coupling portion can be rigid, resilient or flexible, respectively. The interconnection of the coupling portion and the gripping portion can be optional. It is also conceivable to integrally form the coupling and gripping portions. According to a further embodiment of the invention, the gripping portion is an elongated rigid element, preferably formed of metal, and preferably integrally formed with the coupling portion. This element includes means, such as, for example bores by which this element can be attached within or upon a wall. Preferably, such an element defines a wall anchor which is usually used to attach various structures, such as for example frames, particularly of wood, within a structural building.

According to a further embodiment of the invention, the free end of the coupling portion is bent so that the coupling portion has a relatively small clearance when co-operating with the screw head. This embodiment, preferably defining a wall anchor allows the coupling portion to be attached to the screw head under biased conditions or forces.

According to a preferred embodiment of the invention, the carrier device together with a specifically designed screw defines a kit. The screw includes a cylindrical portion defined between the head and the shaft, the diameter of the cylindrical portion being smaller than that of the head. As a result of this specific structure, the screw head is spaced from the article even if completely threaded thereinto. By means of this structure, the coupling portion can be disposed behind the screw head with the screw of course being safely anchored within the article. Preferably, the screw has a drill tip.

It is further understood that the screw is positioned at a location where the operation of the article is not disturbed since it is preferred not to remove the screw.

BRIEF DESCRIPTION OF THE DRAWINGS

Various other objects, features, and attendant advantages of the present invention will become better appreciated from the following detailed description, when considered in connection with the accompanying drawings, in which like reference characters designate like or corresponding parts throughout the several views, and wherein:

FIG. 3 is a perspective view of a further embodiment of the carrier device according to the invention.

FIG. 4 is a side elevational view of a screw to be used in connection with the carrier device according to the invention.

DETAILED DESCRIPTION OF THE ILLUSTRATED EMBODIMENTS

Figure 1:
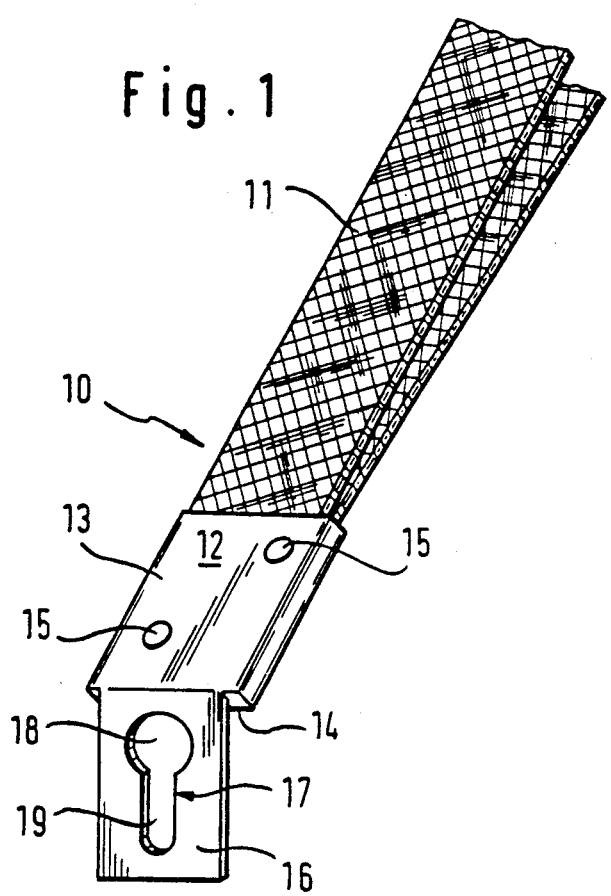
FIG. 1 is a perspective view of one embodiment of the carrier device according to the invention.

The carrier device 10 shown in FIG. 1 includes a loop 11 or band defining a gripping or handling portion, and an integral angular plate-like portion 12 connected to the loop and defining a support portion. The loop is shown partially. It is similar to conventional loops or bands and it is therefore unnecessary to explain it in more detail. The support portion 12 preferably is made from a steel sheet or a similar material. It includes an area 13 wherein the sheet is bent such that a completely encompassed pocket is formed extending in the longitudinal direction. The loop is inserted into the pocket and fastened therein by means of rivets 15. A coupling portion 16 is disposed angularly with respect to the first area 13. It includes an opening 17 having a portion 18 with a larger diameter and a portion 19 having a smaller diameter. The portion 18 of opening 17 can be initially placed around the screw head under non-load conditions. Upon impression of a load upon the carrier device, the coupling portion is automatically displaced upwardly with respect to the screw head, with the screw head engaging smaller diameter portion 19 of opening 17 and thus locking the coupling portion upon the article to be transported. The angle between portions 13 and 16 of the angular member is selected such that the coupling portion can be simply attached to the article to be transported. On the other hand, it should be dimensioned such that portion 13 is substantially aligned with the loop during transportation. An angle of approximately 20° proved to be particularly advantageous.

Figure 2:
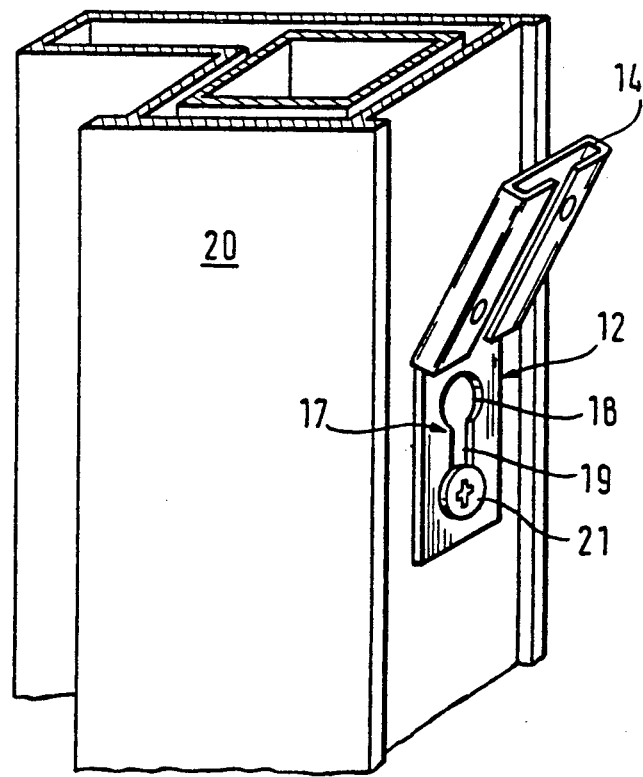
FIG. 2 is a perspective view of the attachment of the coupling portion of the carrier device of FIG. 1 to an article, with the gripping portion being omitted for clarification purposes.

FIG. 2 shows the attachment of a carrier device to a frame 20 for a window which is only partially illustrated. A screw 21 is threaded into the frame 20 upon an external surface thereof. Screw 21 is a drill screw to be described in more detail in connection with FIG. 3. FIG. 2 shows the interconnection of the coupling portion and the drill screw. FIG. 2 illustrates the state wherein the frame is transported. The coupling portion is moved upwardly relative to the screw (the gripping portion is not shown in FIG. 2), whereby the head of the screw engages smaller diameter portion 19 of the opening 17. If the coupling portion is to be removed, it is moved downwardly relative to screw 21. Then, the screw head can be disengaged from the coupling portion through means of the larger diameter portion 18 of the opening.

FIG. 3 illustrates a further embodiment of a carrier device. The gripping portion 11' includes an elongated flat element having throughbores 22, 23. Element 11' can be a conventional wall anchor made of metal which is preferably integrally formed with support portion 12'. The throughbores 22, 23 serve for the attachment of element 11' in or upon a wall, respectively. The free end of the coupling portion 12' includes a bent portion 24. By means of the bent portion 24, the coupling portion 16' can be attached to frame 20' under biased conditions when the coupling portion is disposed behind screw 21' through means of opening 17'.

A particularly unique feature of the screw shown in FIG. 4 is that a cylindrical portion 26 is provided between the screw head 25 and the screw shank 27. As already mentioned, the screw head 25 is disposed a sufficient distance from the article, even when the screw is threaded into the article, by means of portion 26.

The free end of the screw shank is designed as drill tip 28. Screw 21 can therefore be threaded into different articles without the necessity to drill a bore.

Obviously, many modifications and variations of the present invention are possible in light of the above teachings. It is therefore to be understood that within the scope of the appended claims, the present invention may be practiced otherwise than as specifically described herein.

I claim:

1. In combination, an article to be transported and a detachable carrier device for transporting said article, said combination comprising:

a screw bolt, having a head and a shank, threadedly engaged within said article to be transported such that said shank of said screw bolt is threadedly disposed within said article to be transported beneath an exterior surface of said article to be transported while said head of said screw bolt is axially spaced above said exterior surface of said article to be transported by means of a predetermined gap defined between said exterior surface of said article to be transported and an undersurface portion of said head of said screw bolt; and said detachable carrier device comprises a handling portion by means of which said article to be transported can be handled once said detachable carrier device is attached to said article to be transported; a coupling portion; and a support portion integrally connected to one end of said coupling portion for transmitting a load to said coupling portion; said coupling portion including an elongated aperture having a large diameter portion at one end thereof disposed toward said support portion for initially permitting said screw bolt head to pass therethrough under non-load conditions when said elongated aperture is disposed at a first position relative to said screw bolt head, and a small diameter portion at an opposite end thereof disposed away from said support portion for disposition within said gap defined between said exterior surface of said article to be transported and said undersurface portion of said head of said screw bolt, and behind said head of said screw bolt threaded into said article to be transported, when said coupling portion is moved to a second position relative to said screw bolt head under load conditions impressed thereon by means of said support portion; said support portion including pocket means, open at an end portion thereof which is disposed opposite an end portion thereof which is integrally connected to said coupling portion, so as to completely encompass one end portion of said handling portion; and fastening means fixedly mounted within said support portion and passing through said pocket means of said support portion and said one end portion of said handling portion completely encompassed within said pocket means of said support portion for fixedly securing said one end portion of said handling portion within said pocket means of said support portion.

2. The combination of claim 1, wherein said coupling portion completely encompasses said aperture.

3. The combination of claim 1, wherein a handling portion having a looped shape and made of flexible material is fixedly connected to said support portion.

4. The combination of claim 1, wherein said carrier device comprises an elongated plate-like member which is angular in its longitudinal direction, one portion thereof comprising said coupling portion including said aperture and another portion thereof defining said support portion through means of an integral transititional connection portion.

5. The combination as set forth in claim 1, wherein a cylindrical portion is provided between said screw head and said screw shank, the diameter of said cylindrical portion being smaller than that of said screw head.

6. The combination of claim 5, wherein said screw bolt comprises a drilling tip.

7. The combination as set forth in claim 1, wherein:
said coupling portion and said support portion are disposed at a predetermined angle with respect to each other so as to facilitate said transporting of said articles.

8. The combination as set forth in claim 7, wherein:
said support portion is disposed within a plane which is disposed at an angle of approximately 20° with respect to a plane within which said coupling portion is disposed.

9. The combination as set forth in claim 1, wherein:
said articles to be transported comprise frames for building windows and doors.

10. A detachable carrier device for transporting articles, comprising:
a handling portion by means of which said articles can be handled once said detachable carrier device is attached to one of said articles;
a coupling portion comprising an elongated aperture having a large diameter portion at one end thereof for initially permitting said coupling portion to pass over a head portion of a screw, threadedly engaged within one of said articles to be transported, under non-load conditions when said elongated aperture is disposed at a first position relative to said head portion of said screw, and a small diameter portion at an opposite end thereof for disposition behind said head portion of said screw threaded into said one of said articles when said coupling portion is moved to a second position relative to said head portion of said screw under load conditions;
a support portion integrally connected to said coupling portion at one end portion of said support portion for transmitting a load to said coupling portion, and comprising pocket means defined within a second end portion of said support portion, said pocket means being open at said second end portion of said support portion so as to completely encompass an end portion of said handling portion; and
fastening means fixedly mounted within said support portion and passing through said pocket means of said support portion and said end portion of said handling portion completely encompassed within said pocket means of said support portion for fixedly securing said end portion of said handling portion within said pocket means of said support portion.

11. A device as set forth in claim 10, wherein:
said handling portion comprises a flexible band-type strap.

12. A device as set forth in claim 10, wherein:
said coupling portion and said support portion are disposed at a predetermined angle with respect to one another so as to facilitate said transporting of said articles.

13. A device as set forth in claim 12, wherein:
said support portion is disposed within a plane which is disposed at an angle of approximately 20° with respect to a plane within which said coupling portion is disposed.

* * * * *